US005691045A

United States Patent [19]

Lafond

[11] Patent Number: 5,691,045

[45] Date of Patent: Nov. 25, 1997

[54] INSULATED ASSEMBLY INCORPORATING A THERMOPLASTIC BARRIER MEMBER

[76] Inventor: Luc Lafond, 23 Woodvalley Dr., Etobicoke, Ontario M9A 4H4, Canada

[21] Appl. No.: 548,919

[22] Filed: Oct. 26, 1995

Related U.S. Application Data

[63] Continuation-in-part of Ser. No. 513,180, Aug. 9, 1995, which is a continuation-in-part of Ser. No. 477,950, Jun. 7, 1995, Pat. No. 5,616,415, which is a continuation-in-part of Ser. No. 871,016, Apr. 20, 1992, Pat. No. 5,441,779.

[30] Foreign Application Priority Data

Apr. 22, 1991 [CA] Canada .................................. 2040636

[51] Int. Cl.$^{6}$ ................................ B32B 3/26; E06B 3/24

[52] U.S. Cl. ......................... 428/304.4; 428/34; 428/212; 428/316.6; 428/317.1; 428/343; 428/354; 52/786.1; 52/786.13

[58] Field of Search .......................... 428/34, 192, 304.4, 428/316.6, 317.1, 317.3, 318.4, 343, 354; 52/172, 786.1, 786.13

[56] References Cited

U.S. PATENT DOCUMENTS 4,950,344 8/1990 Glover .................................... 156/109

*Primary Examiner*—Donald Loney
*Attorney, Agent, or Firm*—Paul Sharpe; McFadden Fincham

[57] ABSTRACT

Disclosed are embodiments of a composite type spacer for use in insulated glass assemblies. In one embodiment, the spacer includes an alternating sequence of cellular and non-cellular materials. In a further embodiment, there is disclosed a C-shaped body with a cellular material disposed therein and further including a plurality of adhesives and sealants for engagement of the body with substrates. In both instances, the result is a superior one-step extrudible spacer which circumvents the energy limitations with the presently known spacers.

20 Claims, 3 Drawing Sheets

Fig. 1
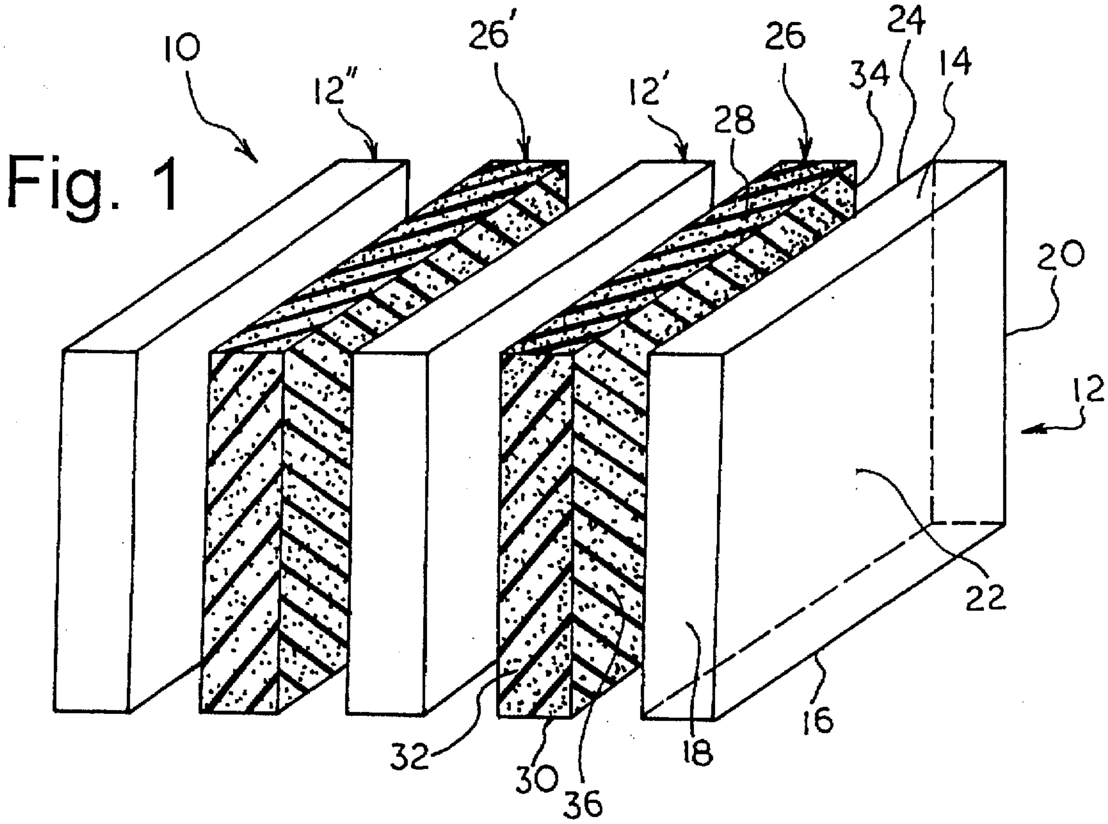
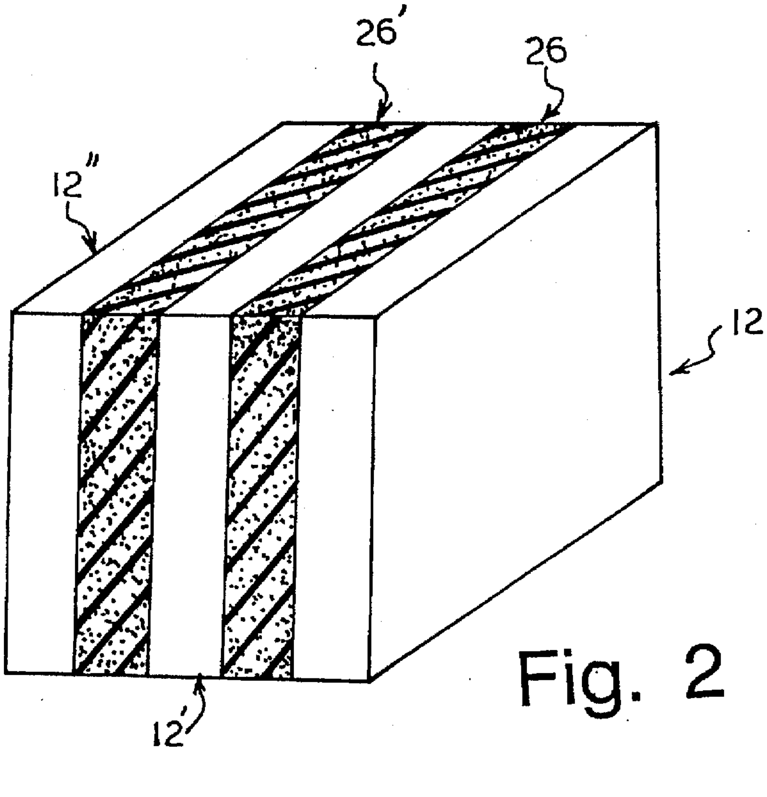
Fig. 2

INSULATED ASSEMBLY INCORPORATING A THERMOPLASTIC BARRIER MEMBER

This application is a continuation-in-part application of U.S. Ser. No. 08/513,180, filed Aug. 9, 1995, which is a continuation-in-part application of U.S. Ser. No. 08/477,950, filed Jun. 7, 1995, now U.S. Pat. No. 5,616,415 which, in turn, is a continuation-in-part application of U.S. Ser. No. 07/871,016 now U.S. Pat. No. 5,441,779, filed Apr. 20, 1992, issued Aug. 15, 1995.

FIELD OF THE INVENTION

The present invention relates to sealant strips for insulated glass assemblies or other insulated substrates and more particularly, the present invention relates to a sealant or spacer strip including a variety of insulating materials.

BACKGROUND OF THE INVENTION

As is well known to those skilled in the art, air is a poor thermoconductor when compared to more ordered matter, e.g., solids. Accordingly, in order to fabricate the most desirable sealant strip, one would be inclined to employ materials having as much encapsulated air associated therewith. This, however, has not been recognized in the art until conception of the present invention.

In general overview according to one embodiment, the present invention includes a composite "sandwiched" strip having alternating layers of insulating material. The material types include both cellular and non-cellular materials to provide support and the maximum amount of "air" in the strip.

Various arrangements have been previously proposed in the art.

Glover et al., in U.S. Pat. No. 4,950,344, provide a spacer assembly including a foam body separated by a vapour barrier and further including a sealant means about the periphery of the assembly. Although this arrangement is particularly efficient from an energy point of view, one of the key limitations is that the assembly must be fabricated in a number of steps. Generally speaking, the sealant must be gunned about the periphery in a subsequent step to the initial placement of the spacer. This has ramifications during the manufacturing phase and is directly related to increased production costs and therefore, increased costs in the assembly itself.

It has been found particularly advantageous to incorporate as a major component of the spacer according to one embodiment, a soft, resilient insulated body having a low thermoconductivity. Examples of materials found to be useful include suitable natural and synthetic cellular materials, natural and synthetic elastomers (rubber, cork, EPDM, silicones, polyurethanes and foamed polysilicones, urethanes and other suitable foamed materials). Significant benefits arise from the choice of these materials, since they are not only excellent insulators from an energy point of view but additionally, depending on the materials used, the entire spacer can maintain a certain degree of resiliency. This is important where windows, for example, engage with such a strip experience fluctuating pressure forces as well as thermocontraction and expansion. By making use of a resilient body, these stresses are alleviated and accordingly, the stress is not transferred to the substrates as would be the case, for example, in assemblies incorporating rigid spacers.

The cellular body, as an example foam, may be manufactured from thermoplastic or thermosetting plastics. Suitable examples of the thermosets include silicone and polyurethane. In terms of the thermoplastics, examples include silicone foam or elastomers, one example of the latter being SANTOPRENE™. Advantages ascribable to the aforementioned compounds include high durability, minimal outgassing, low compression, high resiliency and temperature stability, inter alia.

Of particular use are the silicone and the polyurethane foams. These types of materials offer high strength and provide significant structural integrity to the assembly. The foam material is particularly convenient for use in insulating, glazing or glass assembly, since a high volume of air can be incorporated into the material without sacrificing any structural integrity of the body. This is convenient since air is known to be a good insulator and when the use of foam is combined with a material having a low thermoconductivity together with the additional features of the spacer to be set forth hereinafter, a highly efficient composite spacer results. In addition, foam is not susceptible to contraction or expansion in situations where temperature fluctuations occur. This is clearly beneficial for maintaining a long-term uncompromised seal in an insulated substrate assembly.

It would be desirable to have a spacer or sealant strip which overcomes the limitations of desiccated butyl arrangements or arrangements which provide two or more components but which can be extruded in a one-piece system while additionally providing a highly efficient arrangement. The present invention is directed to satisfying the limitations in the art and providing a spacer which circumvents the previously encountered difficulties.

SUMMARY OF THE INVENTION

One embodiment of the present invention is to provide a sealant or spacer strip having high energy efficiency and further which can be extruded as a one-piece unit.

A further object of the present invention is to provide a sealant strip having a pair of substrate engaging surfaces and opposed faces extending therebetween and having an insulating body adapted for positioning between a pair of opposed substrates, wherein a strip includes overlying layers of first and second differing insulating materials in an alternating face-to-face relationship with one another to form a partial strip and a further layer of the first or second insulating material overlying a different layer of the partial strip.

A further object of the present invention is to provide an insulated glass assembly comprising a pair of substrates, a sealant strip including a layer of a first insulating material and a layer of a second insulating material different from the first insulating material in contacting face-to-face relation with the first material to form a partial strip, a further layer of the first or second insulating material overlying a different layer of the partial strip, each layer cooperating to form a pair of substrate engaging surfaces, and a substrate engaged with a respective surface.

A further object of the present invention is to provide a composite sealing strip for use in spacing substrates, comprising an alternating arrangement of a first layer of insulating material, and a second layer of insulating material different from the first insulating material, the first layer and the second layer in a juxtaposed and contacting relationship, the alternating arrangement further including a third layer of insulating material different from the first insulating material and the second insulating material, the third insulating material being juxtaposed with the alternating arrangement, the layers forming spaced apart substrate engaging surfaces for engagement with a substrate, and sealant material on the substrate engaging surfaces.

In terms of suitable adhesives or sealants for sealing the engaging substrate, any of the useful pressure sensitive adhesives may be employed. Further, uncured adhesives provide utility as do acrylic adhesives. As a further feature, the composite spacer may further include a metallized film to act as a vapour barrier. Suitable films include the polyethylene films, a specific example of which is Mylar™ film having a foil or other form of suitable aluminum or other metal therein. Depending upon the requirements of the sealant strip or spacer, a further layer may be provided in a juxtaposed relationship with the metallized film. As an example, it is contemplated that a desiccated matrix could be employed containing desiccant material dispersed therein. Regarding the matrix for the desiccant, any suitable material such as butyl, polysilicones etc., may be employed. Others will be appreciated by those skilled.

Conveniently, the desiccated matrix may provide an additional sealing surface in the form of a hot melt butyl or polyisobutylene on the edges which would contact the substrates. Conditions where solar energy may present a particular problem with respect to premature dryout and/or seal compromise, it is clearly contemplated that the spacer strips according to all embodiments of the present invention include some form of UV protectant. An example of a suitable protectant would be Tedlar™, known to have ultraviolet blocking capability. Other examples would be readily appreciated by those skilled in the art.

A further object of the present invention is to provide a composite spacer for spacing substrates in a glazing assembly comprising a C-shaped body having a channel of first sealant having substrate engaging arms and a vertical member therebetween connecting the arms, a resilient cellular body within the channel, and at least a second and third sealant different from one another, the second sealant and the third sealant on each of the substrate engaging arms, each sealant being arranged on each said arm such that different sealants alternate.

Suitable insulating polymers useful for the present invention will be readily appreciated by those skilled in the art and include as a possible range: hot melt butylated polymers, polystyrene, polypropylene, polyvinylchloride, polyurethane, etc.

The use of the cellular and more particularly, the foamed material is advantageous in the manufacture of insulated glass assemblies since such materials are composed of a high percentage of air which, as set forth herein previously, is very desirable as a thermal insulator.

The foam material in combination with the second, i.e., non-cellular material, when assembled into an alternating composite strip, results in an extremely energy efficient strip further including a particularly desirable feature, namely, resiliency.

The foam-butyl amalgam allows the substrate, when engaged therewith, a degree of compression and/or expansion. This feature is, desirable since it precludes disruption of the substrate to seal interface which is of paramount importance to the effectiveness of the insulated assembly.

Although the term "glass" is used herein, it will be understood that other suitable substrates, e.g. metal, plexiglass and other plastic materials are within the scope of this invention.

Having thus generally described the invention, reference will now be made to the accompanying drawings, illustrating preferred embodiments.

BRIEF DESCRIPTION OF THE DRAWINGS

FIG. 1 is an exploded view of a first embodiment of the present invention;

FIG. 2 is a perspective view of the strip shown in FIG. 1 in integral form;

Similar numerals in the drawings denote similar elements.

DETAILED DESCRIPTION OF THE PREFERRED EMBODIMENTS

Figure 3:
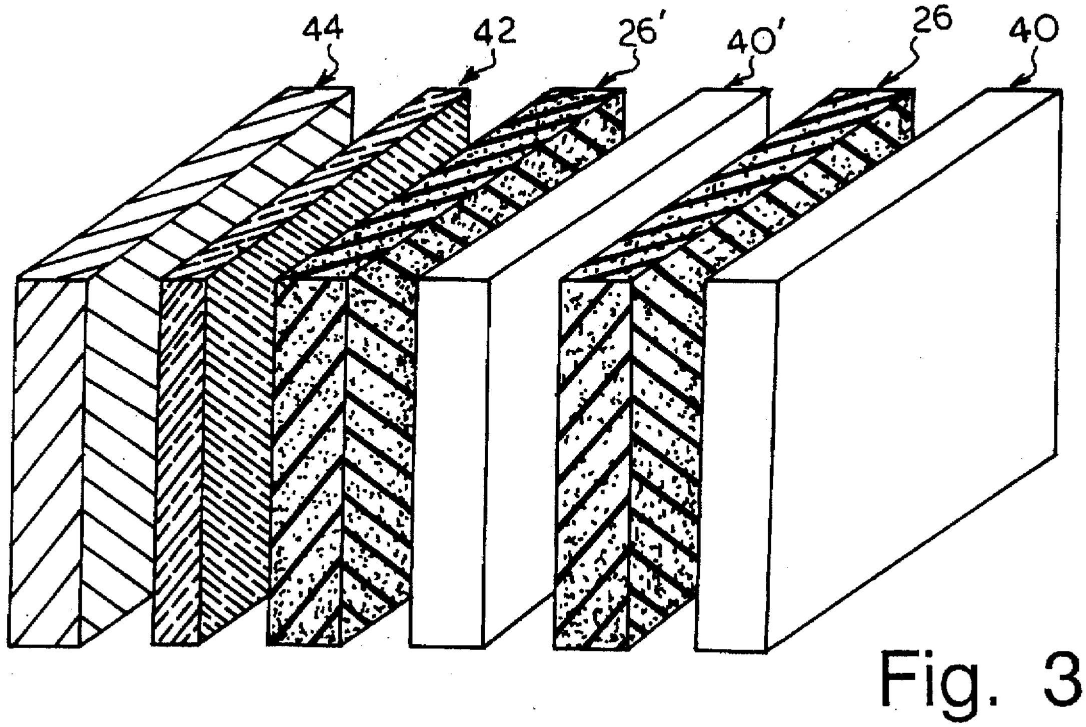
FIG. 3 is an exploded view of the sealant strip according to a further embodiment.

Referring now to FIG. 1, shown is a exploded view of a sealant strip or spacer, globally denoted by numeral 10 according to a first embodiment of the present invention.

In the embodiment shown, there is provided an alternating sequence of sealant material, e.g. butyl, and a cellular material. Specifically, the arrangement 10 comprises a first layer of butyl material, globally denoted by numeral 12, the butyl material having a pair of substrate engaging surfaces in spaced relation and denoted by numerals 14 and 16, respectively and sides 18 and 20. First and second major faces 22 and 24, respectively, complete the layer 12.

A cellular layer, broadly denoted by numeral 26, is in a juxtaposed relationship with layer 12. The cellular material can comprise any foamed material as set forth herein previously or may comprise cork or any other suitable natural cellular material. Layer 26, similar to layer 12, includes spaced substrate engaging surfaces 28 and 30, sides 32 and 34 and major spaced apart faces, only one of which is shown and denoted by numeral 36. Layer 26 and face 24 of layer 12 are in a face-to-face relationship and contact with one another. This is shown more clearly in FIG. 2. As is illustrated in FIG. 1, there is an alternating sequence of the layers 12 and 26 with the additional layers being indicated by prime designations. In the embodiments shown, there are two additional butyl layers 12' and 12" which alternate with layers 26 and 26'.

It will be clear that the substrate engaging surfaces of juxtaposed layers together form a substrate engaging surface discussed hereinafter.

FIG. 2 illustrates the spacer body of FIG. 1 in an integral state. As is illustrated, the substrate engaging surfaces, exemplified by numerals 14 and 28 of layers 12 and 26, respectively, with the similar surfaces of the additional layers define a substrate engaging surface.

Turning to FIG. 3, shown is an alternate embodiment of the present invention. In FIG. 3, numerals 40 and 40' denote hot melt butyl layers which alternate in sequence with foam layers 26 and 26'. In addition, layer 26' includes, in a face-to-face relationship, a vapour barrier 42, which may comprise any suitable form of material known to effect this purpose, an example of which may be Mylar™ or metallized Mylar™. Depending on the specific application, the strip 10 may optionally include a further desiccated matrix, globally denoted by numeral 44, which desiccated matrix may be selected from any of the suitable materials well known in this art. Examples include desiccant loaded silicones, foams etc.

Figure 4:
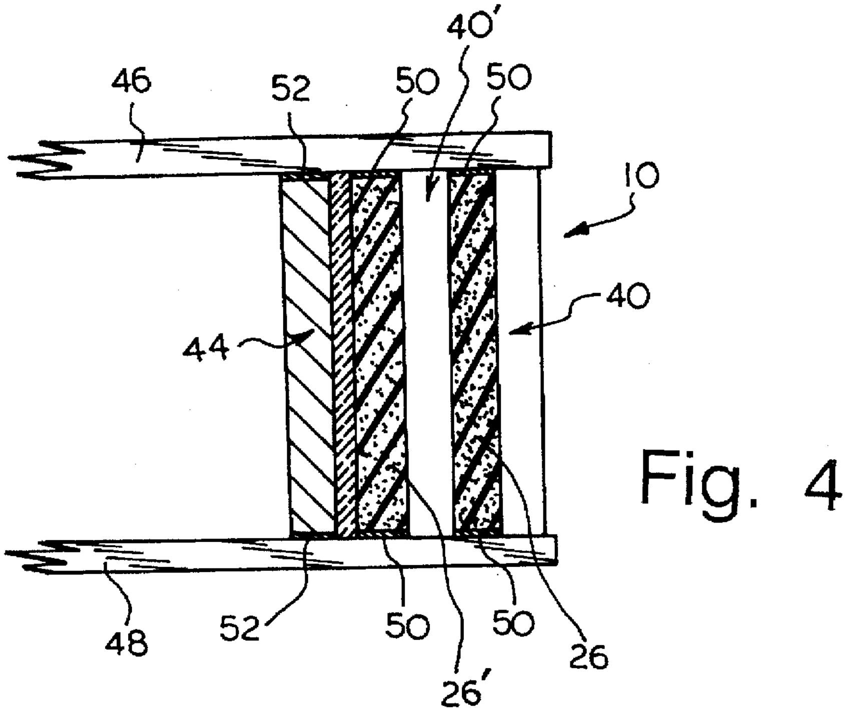
FIG. 4 is a side view of the strip in situ.

FIG. 4 illustrates the strip 10 depicted in FIG. 3 as positioned between a pair of substrates 46 and 48. The strip 10 is fixedly secured between the substrates 46 and 48 by providing pressure sensitive adhesive, uncured adhesive or acrylic adhesive on the substrate engaging surfaces of at least layers 26 and 26'. The adhesive is denoted by numeral 50. In order to secure the desiccated butyl matrix, hot melt butyl or polyisobutylene may be associated with the substrate engaging portions of the matrix 44 as is indicated by numeral 52 in FIG. 4.

Figure 5:
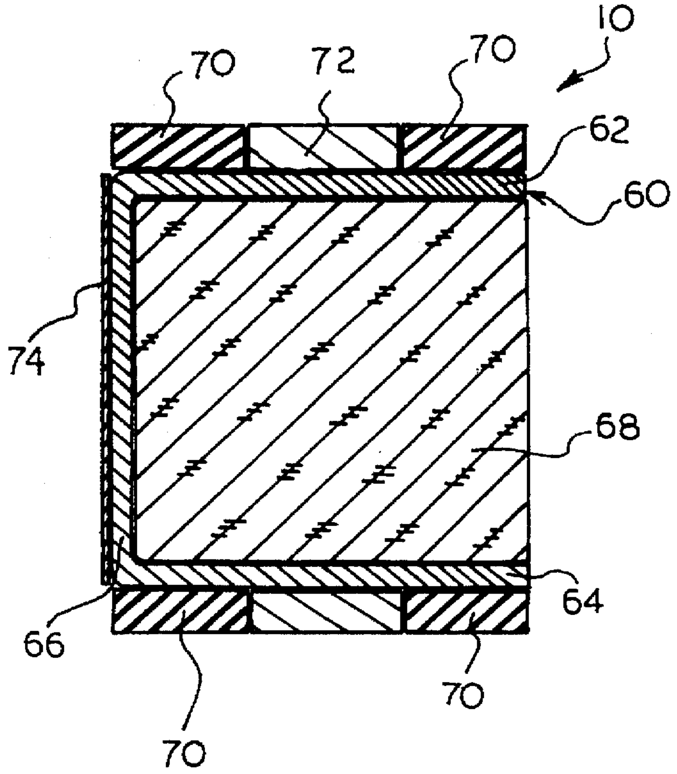
FIG. 5 is a cross-sectional view of a strip according to a further embodiment.

Turning now to FIG. 5, shown is a spacer 10 according to a further embodiment of the present invention. In the embodiment shown in FIG. 5, the spacer includes a generally C-shaped body of sealant material e.g., butyl sealant, the C-shaped body being globally denoted by numeral 60 and including spaced apart substrate engaging arms 62 and 64 and a vertical connecting member 66 extending therebetween. Extending between the substrate engaging arms 62 and 64, there is provided a cellular body 68 which substantially fills the entire area between members 62, 64 and 66. A cellular material may be any one of those materials discussed hereinabove with respect to foams, cork, EPDM, etc. Associated with each substrate engaging arm of the C-shaped body, there is included an alternating arrangement of different sealing and/or adhesive materials for ensuring several bonding areas to a substrate (not shown) when engaged therewith. Specifically, each arm 62 and 64 includes an alternating arrangement of polyisobutylene, denoted by numeral 70, butyl in a juxtaposed relationship therewith, denoted by numeral 72, and a further portion of polyisobutylene juxtaposed with the butyl 72.

Figure 6:
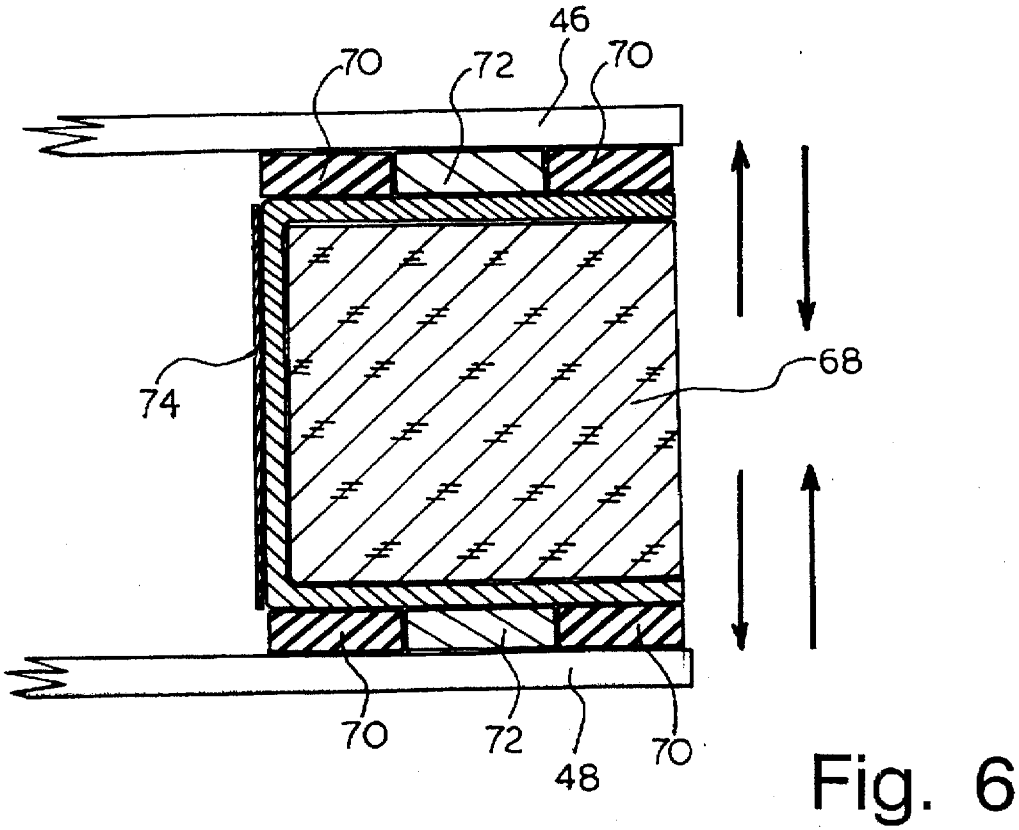
FIG. 6 is a side view of the strip of FIG. 5 in situ.

As an optional feature, the vertical member 66 of the C-shaped body 60 may include a vapour barrier layer 74 for contact within the interior atmosphere of an assembly as illustrated in FIG. 6.

With specific reference now to FIG. 6, shown is the assembly incorporating the spacer or sealant strip as illustrated in FIG. 5. As shown, each of the portions 70, 72 are engaged with a respective substrate 46 and 48. The open end of the C-shaped body 60 is directed to the exterior or the periphery of the assembled unit such that compression and/or expansion between substrates 46 and 48 is possible in the direction of the arrows indicated in FIG. 6. Suitable other materials may be incorporated to act as a backing for the exposed cellular body 68. This will depend upon the specific use of the spacer, however, polyisobutylene would be a suitable example.

As those skilled in the art will realize, these preferred illustrated details can be subjected to substantial variation, without affecting the function of the illustrated embodiments. Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. An insulating spacer and sealant strip having a pair of substrate engaging surfaces and opposed faces extending therebetween and serving as an insulating spacer and seal adapted for positioning between a pair of opposed substrates, comprising:

overlying layers of differing insulating and sealing materials in an alternating face-to-face relationship with one another to form a partial strip and a further layer of insulating and sealing material overlying a different layer of said partial strip; one of said materials being a cellular insulant and another being a resilient sealant.

2. The sealant strip as set forth in claim 1, wherein said strip further includes a first additional layer different from said preceding layers.

3. The sealant strip as set forth in claim 2, wherein said first additional layer comprises a metallized film.

4. The sealant strip as set forth in claim 3, wherein said strip further includes a second additional layer.

5. The sealant strip as set forth in claim 4, wherein said second additional layer comprises a desiccated matrix.

6. The sealant strip as set forth in claim 1, wherein said cellular material comprises a silicone polymer or polyurethane.

7. An insulated glass assembly comprising:

a pair of substrates;

a sealant strip including a layer of a first cellular insulating material and a layer of a second sealant material different from said first insulating material in contacting face-to-face relation with said first material to form a partial strip;

a further layer of the first or second material overlying a different layer of said partial strip, each layer cooperating to form a pair of substrate engaging surfaces; and each substrate engaged with a respective surface.

8. A composite sealing strip for use in spacing substrates, comprising:

an alternating arrangement of:

a first layer of insulating material; and a second layer of insulating sealant material different from said first insulating material, said first layer and said second layer in a juxtaposed and contacting relationship, said alternating arrangement further including a third layer of insulating material different from said first insulating material and said second insulating sealant material, said third insulating material being juxtaposed with said alternating arrangement, said layers forming spaced apart substrate engaging surfaces for engagement with a substrate; and sealant and adhesive material on said substrate engaging surfaces.

9. A composite sealing strip as set forth in claim 8, wherein said adhesive is selected from the group consisting of pressure sensitive adhesive, uncured adhesive, and acrylic adhesive.

10. A composite sealing strip as set forth in claim 8, further including a fourth insulating and sealant material different from said first, second and third materials and juxtaposed with said third insulating material.

11. A composite sealing strip as set forth in claim 10, wherein said fourth insulating material comprises a desiccated matrix.

12. A composite spacer for spacing substrates in a glazing assembly. comprising:

a C-shaped body having a channel and having substrate engaging arms and a vertical member therebetween connecting said arms;

a resilient cellular body within said channel; and at least first and second sealant and adhesive materials different from one another, located on each of said substrate engaging arms, each said sealant and adhesive materials being arranged on each said arm such that different materials alternate.

13. The composite spacer as set forth in claim 12, further including a metallized film on said vertical member.

14. The composite spacer as set forth in claim 12, further including auxiliary vapour barrier means.

15. The composite spacer as set forth in claim 12, wherein said cellular body comprises foamed polymer.

16. The composite spacer as set forth in claim 12, wherein polyisobutylene sealant is present on the arms.

17. The composite spacer as set forth in claim 15, wherein said cellular body comprises a desiccated cellular matrix.

18. The composite spacer as set forth in claim 12 in combination with a first and second glass substrate engaged with a respective arm to form an insulated glass assembly.

19. The assembly of claim 7 wherein at least two separated layers of cellular material are present.

20. The assembly of claim 19 including a vapour barrier layer and a desiccated matrix layer.

* * * * *